United States Patent
Himmel

Patent Number: 6,167,441
Date of Patent: Dec. 26, 2000

[54] CUSTOMIZATION OF WEB PAGES BASED ON REQUESTER TYPE

[75] Inventor: Maria Azua Himmel, Austin, Tex.

[73] Assignee: International Business Machines Corporation, Armonk, N.Y.

[21] Appl. No.: 08/976,405

[22] Filed: Nov. 21, 1997

[51] Int. Cl.⁷ .................................................. G06F 15/16
[52] U.S. Cl. ...................... 709/217; 709/246; 709/219; 707/104
[58] Field of Search .................... 709/217, 203, 709/219, 206, 246; 707/104, 205, 100, 101, 103

[56] References Cited

U.S. PATENT DOCUMENTS

| | | | |
|---|---|---|---|
| 5,442,749 | 8/1995 | Northcutt et al. | 709/219 |
| 5,727,159 | 3/1998 | Kikinis | 709/246 |
| 5,794,039 | 11/1998 | Guck | 707/103 |
| 5,802,292 | 9/1998 | Mogul | 709/219 |
| 5,848,415 | 12/1998 | Guck | 707/103 |
| 5,864,870 | 1/1999 | Guck | 707/104 |
| 5,911,776 | 6/1999 | Guck | 709/217 |
| 5,918,013 | 6/1999 | Mighdoll et al. | 709/217 |

FOREIGN PATENT DOCUMENTS

| | | |
|---|---|---|
| 0851367A1 | 1/1998 | European Pat. Off. . |
| 10-133973 | 5/1998 | Japan . |

OTHER PUBLICATIONS

Digestor: Device–Independent Access To The World Wide Web, Timothy W. Bickmore and Bill N. Schilit. pp. 1–8, 1997.

Primary Examiner—Glenton B. Burgess
Assistant Examiner—Chuong Ho
Attorney, Agent, or Firm—Jeffrey S. LaBaw

[57] ABSTRACT

Customized Internet content is provided to a requesting client device using an intercepting agent based on the capabilities of the requesting client. The agent, typically at the web server to which the client request is directed intercepts a request made by a requesting client device for a file from a web server. The agent detects client device capability information about the requesting client device, such as display or memory capabilities. The client request is redirected to a Uniform Resource Locator (URL) according to the detected client device capability information to retrieve a version of the requested file.

25 Claims, 5 Drawing Sheets

Please select your computer

Aptiva S38 ▽ — 251

If not listed please enter computer name

— 253

Describe type of computer

Palm Top-Color ▽ — 255

Choose the picture that looks best 257　　259　　261　　263

CUSTOMIZATION OF WEB PAGES BASED ON REQUESTER TYPE

BACKGROUND OF THE INVENTION

This invention relates generally to communication in a distributed network computing environment. More particularly, this invention relates to customizing the selection of Web pages in an Internet environment based on the requesting client device.

The World Wide Web, or simply "the web", is the Internet's multimedia information retrieval system. It is the most commonly used method of transferring data in the Internet environment. In the Web environment, clients request Web pages from Web servers using the Hypertext Transfer Protocol (HTTP). HTTP is a protocol which provides users access to files which include text, graphics, images, sound, using a standard page description language known as the Hypertext Markup Language (HTML). HTML provides document formatting allowing the developer to specify links to other servers in the network. The path to a particular Web server is defined by a Uniform Resource Locator (URL). Web pages are typically accessed using an HTML compatible browser such as Netscape Navigator which specifies the link to the Web Server and particular Web page using the URL.

With the popularity of World Wide Web, many companies are devoting a majority of their development effort to produce software applications running on the Internet using the Internet protocols such as HTTP and HTML. Other methods exist such as the File Transfer Protocol (FTP) and Gopher, but have not achieved the popularity of the Web.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML.

As Web browsers become the primary interface for access to many network and server services, Web applications in the future will need to interact with many different types of client machines including the typical personal computer to "thin" clients. Thin clients can range between 60 inch TV screens to handheld mobile devices. This large range of devices creates a need to customize the web GUI to the type of device to which the server is communicating. Using prior art technology one would most likely need to write different HTML pages or different web programs, e.g., java, cgi, etc., to handle the GUI and navigation requirements of each client environment.

The client devices differ in their display capabilities, e.g., monochrome, color, different color palettes, resolution, size. They also vary in the input devices which may be attached, e.g., mouse and keyboard, touch sensor, remote control for a TV set-top box. Furthermore, the browsers themselves can vary in the languages supported, e.g., HTML, dynamic HTML, XML, Java, JavaScript. Because of these differences, the web browsing experience of browsing the same web page may differ wildly depending on the client device.

This incapability to adjust to the client's capabilities and environment causes a number of problems. The site may simply be incapable of servicing a set of clients, or make the web browsing experience confusing or unsatisfactory in some way. Even if the web developers have made an effort to accommodate a range of client devices, the code for each application may need to be duplicated for each environment. Duplicated code consequently increases the maintenance cost for the Web site. Frequently, different URLs are required to be known for different classes of clients for different HTML pages, CGI programs and so forth.

This invention presents a novel solution for the problem.

SUMMARY OF THE INVENTION

Therefore, it is an object of the invention to support a multitude of different client devices for an Internet application.

It is another object of the invention to minimize additional product development effort in creating the support for a variety of client devices.

It is another object of the invention to determine the type of client device which is requesting services from a web server.

It is another object of the invention to customize an Internet application for a variety of client devices.

These and other objects are accomplished by providing customized Internet content to a requesting client device using an intercepting agent. The agent, typically at the web server to which the client request is directed intercepts a request made by a requesting client device for a file from a web server. The agent detects client device capability information about the requesting client device, such as display or memory capabilities. The client request is redirected to a Uniform Resource Locator (URL) according to the detected client device capability information to retrieve a version of the requested file.

The agent at a web server can parse the header information of the request for the client device capability information. The header information sent in a typical request, e.g., an HTTP request, includes a browser identification and browser level from which device capabilities can be inferred. If the header information can not be parsed, or does not contain the needed information, a snooping operation performed at the requesting client device can retrieve the needed client device information. The snooping operation can be performed remotely or can be performed by a snooping agent downloaded from a web server. If snooping is unsuccessful, the client device information can be retrieved from user input to a downloaded page at the requesting client device. The downloaded page may include a set of images and the retrieved user input is a preferred image appearance on the requesting client device.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a hand held computer, a personal computer, a mini computer, mainframe computer or a computer running in a distributed network of other computers. In fact the invention assumes that a variety of client devices running a variety of browsers is in use in the Internet or intranet. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
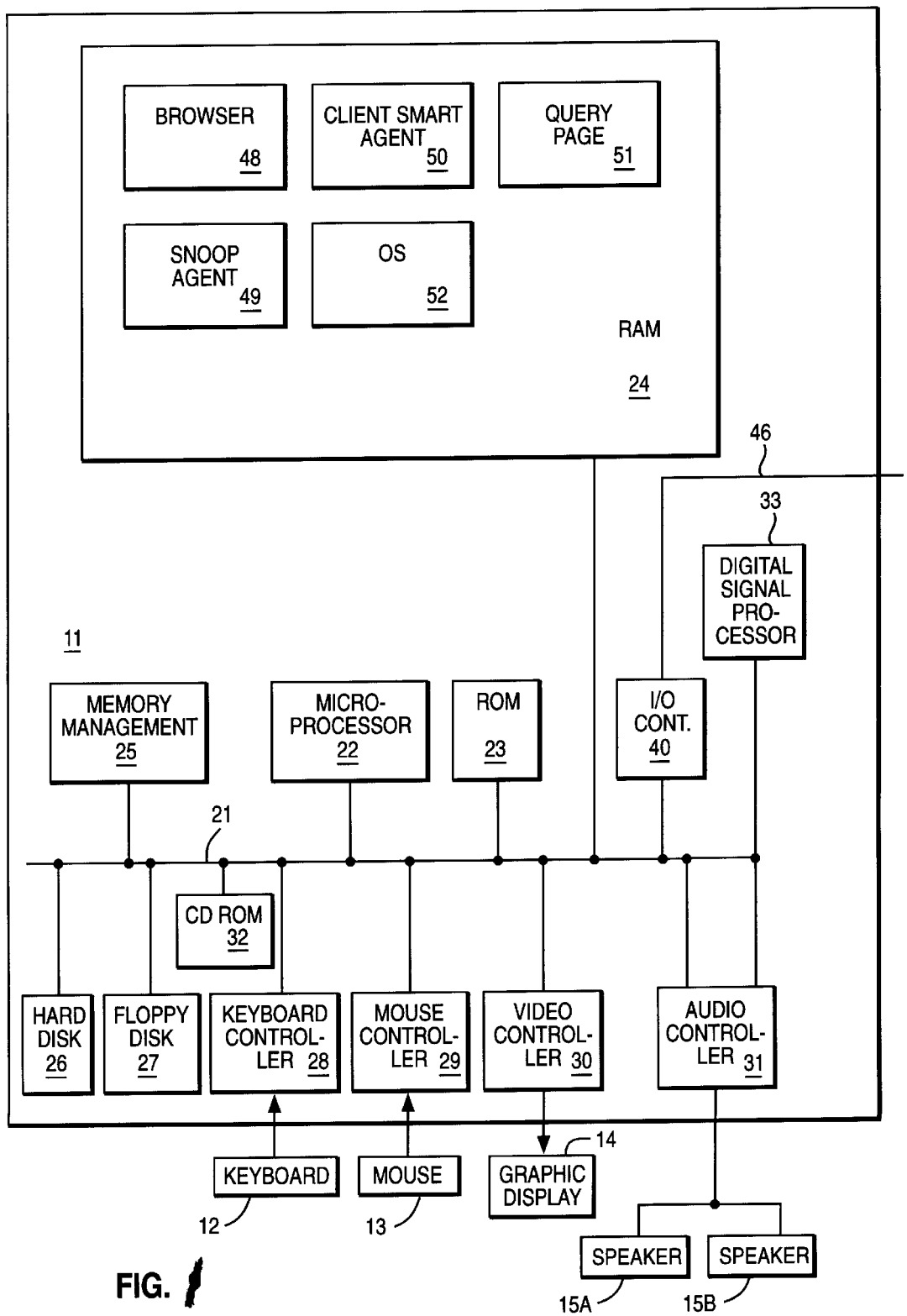
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

Depending on the client device, there will be differences in the capabilities of the display, memory and processor. In addition, some devices, notably handheld devices, may lack some of the elements discussed above such as a keyboard and mouse, substituting them with a touch screen and stylus. These devices generally communicate with the network using a wireless transmission means in the RF or IR spectrums. Set top boxes such as WebTV may lack the keyboard and mouse, substituting a handheld remote of limited capability. The use of a conventional television instead of a computer monitor also means that the display will lack the resolution and addressable screen size assumed by the developers of user interfaces for computer interfaces. The present invention allows a customized user interface for these and other client devices.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

The invention enables a plurality of web client types to be supported by an Internet application by creating a set of web pages each of which is formatted for readability for a particular supported device. In the preferred embodiment, there is one URL per supported application, although once at the web server the request may be redirected to another URL which contains the pages for the particular device. The returned HTML page contains the response from the server for the requested service customized according to the client device. Through the invention, the response data on the response HTML page is chosen for the best format and content to be optimally read, interpreted and displayed by the client device.

Figure 2:
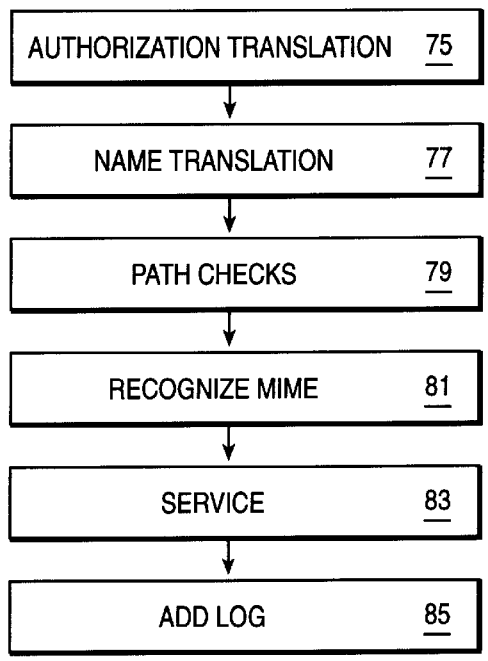
FIG. 2 is a flow diagram of a web request for a page in the Internet.

In the Internet, the Web server accepts a client request and returns a response back to the client. A series of server computer may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a systemdependent file name, a redirection URL or a mirror site. In the path checks step 79, the server performs various tests on the resulting path to ensure that the given client may retrieve the document.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/. . ." where "somehost" is the hostname position of the URL. The usual manner in which a URL is resolved into an actual IP address for a web server is through the use of a nameserver. In an Internet or intranet network, a nameserver 42 maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content made by the browser.

This invention includes a server application that intercepts, or otherwise handles, the HTML requests from requesting clients to a particular HTTP server or application thereon. This application, the "client-smart agent", attaches itself to the HTTP server and redirects the server to the correct page depending on the client device. "Attaching" the server application to the HTTP server basically assures that the client-smart agent can communicate with the HTTP Server. The "attaching" can be done using interfaces (APIs) between the HTTP server and the Client_Smart agent. Alternatively, the Client_Smart agent can be implemented as an application which intercepts the HTTP requests before the HTTP server receives them. The application developer can use a commercial HTML server to write the web pages and then use additional utilities to configure the Internet application to the client-smart agent.

The user can always use the same URL, but different pages would be served depending on the client's machine. The client-smart agent is configured for each of a plurality of supported client types.

The client-smart agent works in conjunction with the HTTP server to process the correct HTML configuration for the specified client. The client-smart agent reads from the HTTP header information the client browser type and operating system in use. For example, the client-smart agent can easily discover that a client request originates at Netscape Navigator browser for Windows 95 at a particular version level from the header information in the HTTP packet. Similar information is found in the header packets of other Internet protocols so that the invention is not limited to HTTP.

If based on the HTTP header information, the client device can not be identified, the client-smart agent will send an applet, the client-snooper agent, over the network to the client machine to identify the client type. This client-snooper can be written as a client side JavaScript HTML page, java program, or java applet to identify the client device. Once the client device has been identified, the "client-smart agent" sends the correct HTTP request to the HTTP server. If the "client-snooper" is not able to identify the client's device type, the "client-smart agent" can be configured to do any of the following. The user receives an error, however, this is not preferred. Alternatively, the user receives a web page asking to identify his/her device from a list provided. The web page may contain an entry field for entry of an unlisted client device. The web page may also include a several web page samples, asking the user to select the web page which looks best. Further web pages would be selected from among the available web pages at the server on the basis of this choice. Finally, the client-smart agent can use a default configuration or make an educated guess on the client's device to redirect a request to the appropriate page on the HTTP server.

The client-smart agent is capable of analyzing the HTML code and web applications and select the correct interface for a configured client type. Each supported client device type is configured in the smart-client agent by the developer of the Internet application. This configuration process includes the description of the screen size, input devices, e.g., pen, touch-screen, mouse, TV remote control, software compatible with the browser, i.e. the Java and HTML level supported on the client, amount of memory and other client device parameters.

Figure 3:
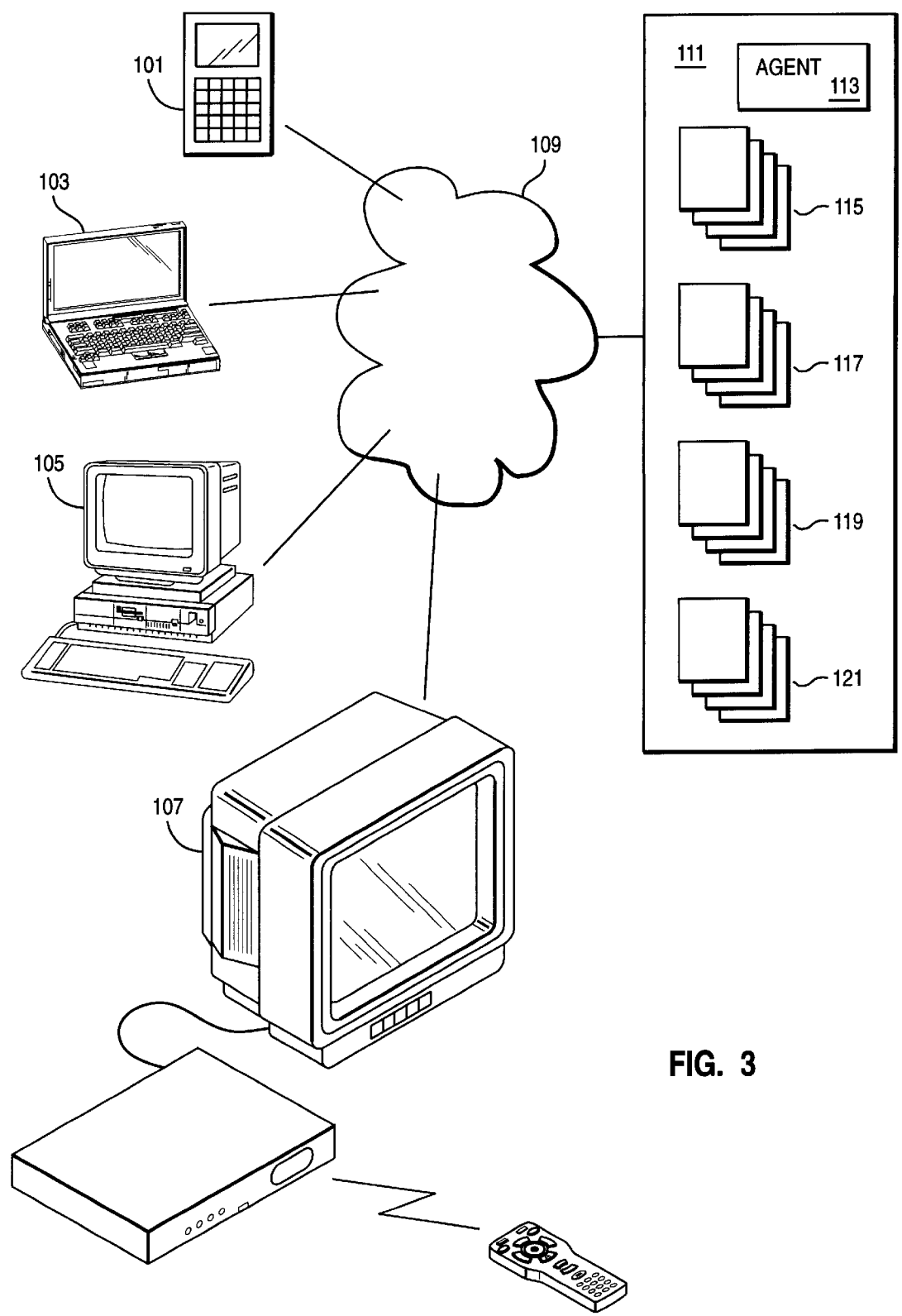
FIG. 3 is a simplified architectural diagram of an Internet including a plurality of client types and a web server serving several sets of web pages using the current invention.

FIG. 3 shows a simplified depiction of an Internet environment in which the invention may be implemented. A variety of client device types 101, 103, 105, 107 are coupled to the Internet 109 by wired or wireless means. The clients 101–107 can make HTTP requests to a web server 111 for one or more applications. The client-smart agent 113 redirects the client request to the appropriate web page depending on the detected client type. In the figure, four web page functions are provided by a respective set of web pages 115, 117, 119, 121. Each set of web pages has a respective web page appropriate for a particular web client device. Those skilled in the art would recognize that a plurality of each type of client devices would typically be connected to the Internet. Further, there may be a number of intermediary servers, gateways and routers between the clients and the web server which are not depicted.

Figure 4:
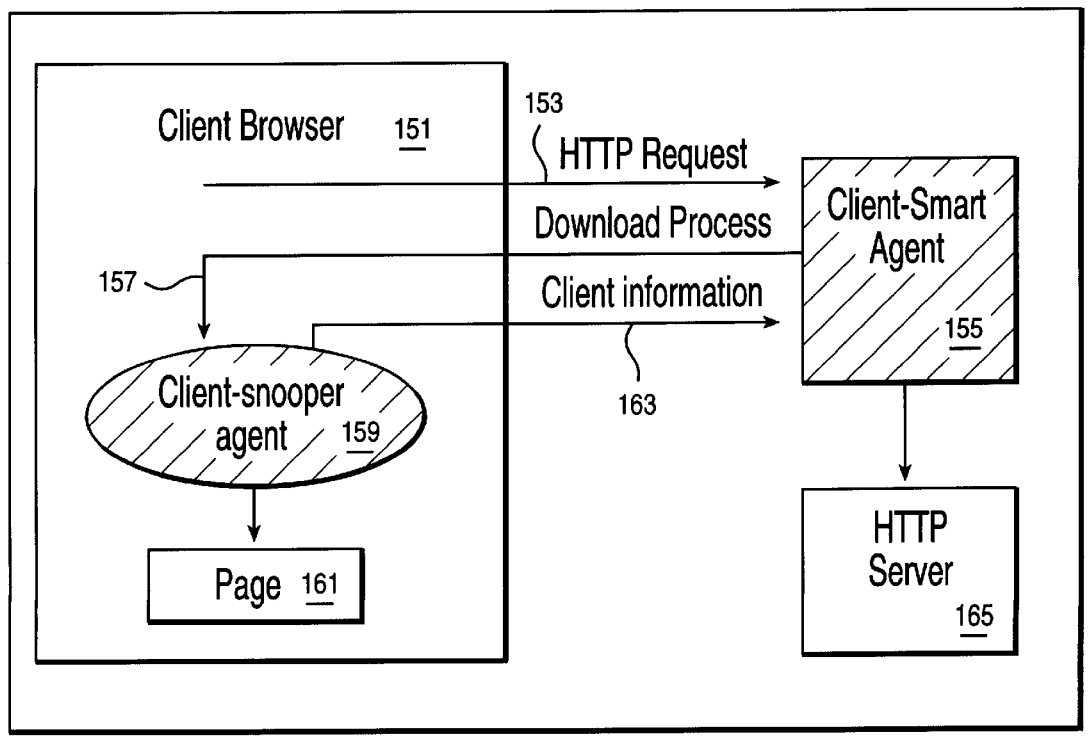
FIG. 4 is an architectural diagram showing the components of needed to practice a preferred embodiment of the invention.

FIG. 4 is an architectural diagram of the components needed in the preferred embodiment of the invention. A client browser 151 resident at one of the client devices issues an HTTP request 153 for an HTML page at a particular URL or for a Web application using Perl CGI, Java, JavaScript or other language. The request is directed to the client-smart agent 155 which first attempts to identify the client using the HTTP header information. If this is unsuccessful, the client-smart agent downloads 157 a client-snooper agent 159 to the client to get the information necessary about the client device to choose an appropriate web page. A variety of snooping techniques are available to the client snooper. Many client operating systems keep information on their attached devices. In Windows 95, for example, there is a registry in which the hardware devices are listed notably processor, processor speed, monitor, including size as well as other information less directly applicable to the present invention. Detecting the type of operating system alone may be enough to choose the appropriate web page. Examination of the system BIOS can provide useful information. Search routines for specific signatures for specific supported client devices are be incorporated in the client snooper agent 159. If the snooper agent is not successful, the snooper agent 159 can present a page 161 which queries the user for information which could be useful in selecting an appropriate web page. Alternatively, the snooper agent 159 could report its failure to the client-smart agent 155 and the client-smart could issue a web page for the user query. This interface is discussed below in greater detail with reference to FIG. 6.

The client-snooper agent 159 returns the necessary information about the client device to the client-smart agent 155. Using this information, the client-smart agent selects the appropriate HTML page or web application format for the client to which to redirect the client request.

Figure 5:
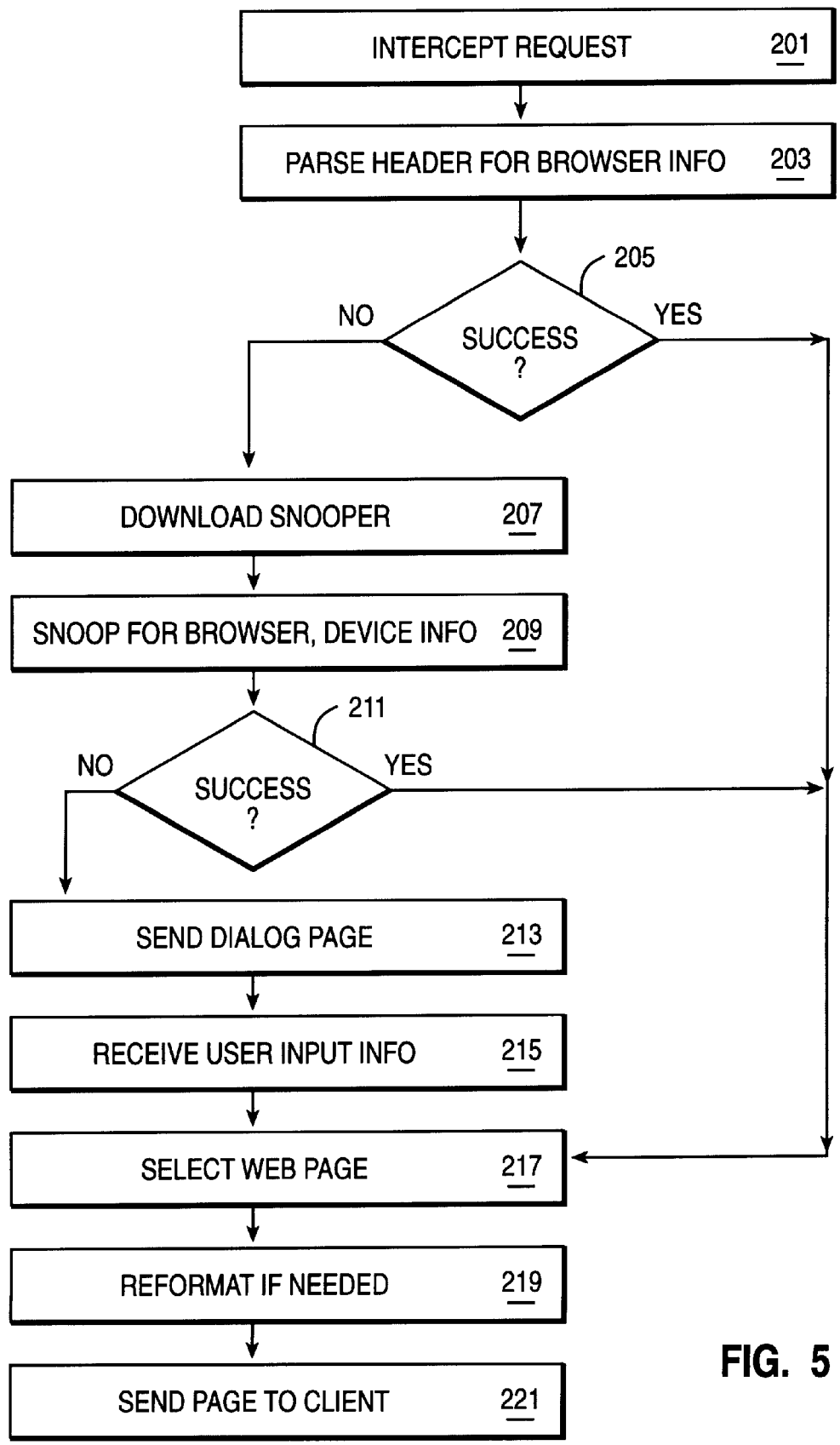
FIG. 5 is a flow diagram of the process for using the present invention.

A flow diagram for this process is shown in FIG. 5. The process begins in step 201, where the client-smart agent intercepts an HTTP request directed to a supported server application. In step 203, the client-smart agent parses the HTTP for the browser information which can be used to infer the client device characteristics. Step 205 determines whether the parsing was successful.

If the parsing is unsuccessful due to an unknown browser or browser version level, in step 207, the client snooper is downloaded to the client machine. Alternatively, many operating systems have APIs which may be queried remotely using an API. Of course, a remote snoop might involve several iterations until the operating was identified. In step 209, the client device is snooped for device, operating system and/or browser information. Step 211 determines whether the snooping was successful.

If the snooping was not successful, a dialog page can be sent to the user, preferably in a language which can be presented by the browser. The page can originate with the snooper agent already at the client or from the client-smart agent back at the server. In step 215, user input to the page is received and sent back to the client-smart agent. Based on the information from the parsing, snooping or receiving steps, the client-smart agent determines the appropriate page to send the HTTP request, step 217. The selected web page is dynamically reformatted, if necessary, according to the detected client type. Finally, in step 221, the selected web page is sent to the client machine.

The invention provides that some of the customization of the page interface is static with prebuilt web pages for a supported client device or set of client devices. Other aspects of the customization may be dynamic modification of the web page content performed on the fly. Requests from clients having vastly different display sizes are likely to be directed to different web pages on different URLs. Requests from clients with similar screen sizes, but different display characteristics such as color palettes may be directed to the same URL, however, the embedded URLs which point to image data within the overall page may be dynamically selected to provide the image which will look the best for the detected client device. Yet others such as font or font size can be dynamically adjusted in the HTML on the fly.

In addition to the device type consideration, the invention can be used to deal with browser considerations as well. The invention preferably supports any browser, even back level browsers which may not support a particular language or version of the language which may have become prevalent since the browser was written. Rather than forcing the user to upgrade to a new browser, the invention will allow the client-smart agent to select a web page which is within the parsing and presentation capabilities of the detected browser.

Typically, the client-smart agent would redirect the HTTP requests to the HTTP server using the HTTP Server APIs used by the particular server. Known HTTP servers produced by the Netscape and Microsoft Corporations have this type of interfaces. Alternatively, the client-smart agent could intercept the HTTP request and change the request to a new URL before routing it back to the URL. On the server, the software that does the routing has a ONE to MANY relationship between the URL given to the user (client) and the actual server addresses. For example, "http://GM/newproducts" can be translated to "//GM/newproducts.FloorApp" to display the car information on the PalmTop computers available to the sale force on car dealers. The same URL can be translated to "//GM/newproducts.WebTV" for WebTV applications. Further, the URL can be translated to "//GM/newproducts.PC" for a browser running on a personal computer.

A default web page can be developed when a device can not be identified, however, given the three techniques described herein, it is doubtful that a default web page would see much use unless one of the web pages for a class of client devices was simply designated the default.

Figure 6:
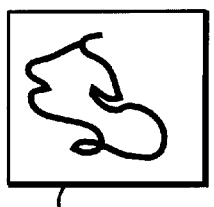
FIG. 6 is a partial web page for making a choice of web pages to be presented by an HTML compatible browser at a client device.
Figure 6:
Figure 6:
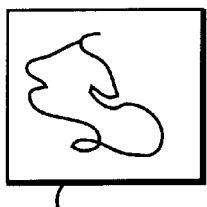
Figure 6:

As mentioned above, if the client snooper was not able to identify the client, a web page sent from the snooper or the client smart agent can be sent asking the user to identify the machine type. Alternatively, but possibly in addition to, the user can be afforded an opportunity to select the "page formatting" from a list. A sample page is shown in FIG. 6. Those skilled in the art would under stand that alternative formats are possible with different sets of controls. A dialog of several alternative pages could be presented where the client browser and server application try out different web pages to see which is best for the client device.

A pulldown list box 251 in which various supported client devices are listed can be presented to the user. The user can select the client computer which he is using. Both specific computers and computer models can be listed as well as names of manufacturers or generic descriptions such as "486 personal computer" might be listed in another pulldown list box 255. There could be an additional field for the browser resident on the client system. If not found, the user can enter the computer name in entry field 253. Alternatively, the user can be presented a set of images 257, 259, 261, 263 and be asked to select the image that looks best.

The combination of entry field 253 and image selection could be used in a registration procedure for a new type of device. Presuming that the client-smart agent or snooper was able to retrieve some information, but that it did not correlate to any of the information in any of its data structures, the parsed or snooped information could be retained and associated with image selected by the user. The new device type information can now be entered into the client-smart agent database. The next time another device of the same type is detected, the redirection of the page can occur automatically.

The registration procedure is not preferred for an ordinary user since it does detract from the web browsing experience. However, for a network administrator action upon the introduction of a new device into his network, or a web designer allowing a new type of client device to operate with his web page, the registration procedure is a simple way of expanding the capabilities of the network or web page with a minimal amount of knowledge about the new device or its browser. The interaction can be expanded to include language tests to see what languages and levels of the language the browser and device can interpret. A set of dialogs including images generated by various languages can be shown to the administrator with an accompanying query, e.g., "Can you see an animated widget in the rectangle above?". For example, a three dimensional figure could be animated by a Virtual Reality Modeling Language (VRML)

script accessed by a Java applet. Confirmation of the presentation of the object would serve as detecting information about the new client device. Once the interaction is complete, the new device can be entered into the databases associated with the client-smart agent. Future requests from devices of this type can thus be handled seamlessly.

A set of utilities is preferably provided for the invention to aid in the development of web pages. A web designer could check a prototype page into the set of utilities. The developer would be asked which types of devices he would like his application to support. The utilities would enter into a dialog with the utility to make a respective page for each supported device. For example, to adapt a prototype page to a WebTV client device which has a smaller effective display space than a computer monitor, the developer might be given the option of dragging and dropping objects from the prototype web page to new positions or to automatically include a scroll bar in the page. Other considerations which could be accommodated by the utilities for a respective set of web pages includes color versus monochrome, color palettes, monitor size and resolution and the user input device. A touch screen would benefit from a different spacing of selectable objects in the web page than common for mouse based interfaces.

As mentioned above, some characteristics such as monitor size result in redirection to a new URL, while other adaptations such as font size can be made on the fly.

The invention can be used to detect the language version of the browser since this information is typically in the header information. Also, locale information is usually present in the operating system and can be effectively snooped. Consequently, the HTTP request can be redirected to web pages written in the appropriate language.

The version level of the browser can be compared to a table of information on which Internet language and protocols are supported by the browser. Thus, pages which include Internet languages not supported by a given browser can be avoided.

The invention is widely applicable to a variety of web applications. Examples of web applications which would benefit from the invention include international applications that cover many different types of devices, e.g., palmtops, personal computers, laptops, WebTV. The invention allows developers to reduce the cost of developing pages. A package delivery company could have an inventory application which the drivers access by means of a wireless palmtop device, but which the managers and accounts access by means of personal computers connected to the local area network in the office. Both sets of browsers could be easily accommodated by the invention. Further, this invention allows a company to advertise one single URL, i.e. in television or print advertising, for all possible devices.

While the invention above has been described in terms of the HTTP and HTML as they are commonly associated with URL processing in the Web, those skilled in the art will readily appreciate that other Internet protocols are known and could easily be adapted to the teachings of the invention.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for providing customized Internet content to a requesting client device, comprising the steps of:
    intercepting a request by a requesting client device for a file from a web server;
    detecting client device display capability information about the requesting client device, wherein the client device display capability information includes data relating to physical display characteristics of a client device display; and
    redirecting the request to a Uniform Resource Locator (URL) according to the detected client device display capability information to retrieve a version of the requested file.

2. The method as recited in claim 1 wherein the detecting step is performed by an agent at a web server which parses the header information of the request for the client device display capability information.

3. The method as recited in claim 2 wherein a browser identification and browser level in the header information is used to detect the client device display capability information.

4. The method as recited in claim 1 wherein the client device display capability information is received from a snooping operation at the requesting client device.

5. The method as recited in claim 4 wherein the snooping operation is performed by a snooping agent downloaded from a web server.

6. The method as recited in claim 1 wherein the client device display capability information is retrieved from user input selections to a downloaded page at the requesting client device.

7. The method as recited in claim 6 wherein the downloaded page includes a set of images and the retrieved user input is a user selection of a preferred image appearance on the requesting client device.

8. The method as recited in claim 1 wherein some, but not all characteristics of the retrieved version of the file are dynamically modified according to the detected client device display capability information.

9. The method as recited in claim 1 wherein the device capability display information includes a set of languages supported by a browser on the requesting client device.

10. The method as recited in claim 1 further comprising the step of dynamically reformatting the retrieved version of the requested file.

11. The method as recited in claim 1 wherein the requested file is a web page written at least in part in a markup language.

12. A system including processor and memory for providing customized Internet content to a requesting client device, comprising:
    means for intercepting a request by a requesting client device for a file from a web server;
    means for detecting client device display capability information about the requesting client device, wherein the client device display capability information includes data relating to physical display characteristics of a client display device; and
    means for redirecting the request to a Uniform Resource Locator (URL) according to the detected client device display capability information to retrieve a version of the requested file.

13. The system as recited in claim 12 wherein the detecting means is an agent at a web server which parses the header information of the request for the client device display capability information.

14. The system as recited in claim 13 wherein a browser identification and browser level in the header information is used to detect the client device display capability information.

15. The system as recited in claim 12 wherein the client device display capability information is received from a snooping operation performed at the requesting client device.

16. The system as recited in claim 15 further comprising a snooping agent to perform the snooping operation to be downloaded to the requesting client device.

17. The system as recited in claim 12 further comprising a downloadable page for retrieving the client device display capability information according to user input indicative of the client device display.

18. The system as recited in claim 17 wherein the downloaded page includes a set of images and the retrieved user input is a user selection of a preferred image appearance on the requesting client device.

19. A computer program product in a computer readable medium for providing customized Internet content to a requesting client device, comprising:

means for intercepting a request by a requesting client device for a file from a web server;

means for detecting client device display capability information about the requesting client device, wherein the client device display capability information includes data relating to physical display characteristics of a client display device; and means for redirecting the request to a Uniform Resource Locator (URL) according to the detected client device display capability information to retrieve a version of the requested file.

20. The product as recited in claim 19 wherein the detecting means is an agent to be installed at a web server which parses the header information of the request for the client device display capability information.

21. The product as recited in claim 20 wherein a browser identification and browser level in the header information is used to detect the client device display capability information.

22. The product as recited in claim 19 wherein the client device display capability information is received from a snooping operation performed at the requesting client device.

23. The product as recited in claim 22 further comprising a snooping agent to perform the snooping operation to be downloaded to the requesting client device.

24. The product as recited in claim 19 further comprising a downloadable page for retrieving the client device display capability information according to user input indicative of the client device display.

25. The product as recited in claim 24 wherein the downloaded page includes a set of images and the retrieved user input is a user selection of a preferred image appearance on the requesting client device.

* * * * *